May 9, 1933.  F. L. VAN WEENEN  1,907,622
DEVICE FOR INJECTING LIQUID UNDER PRESSURE
Original Filed Dec. 4, 1926
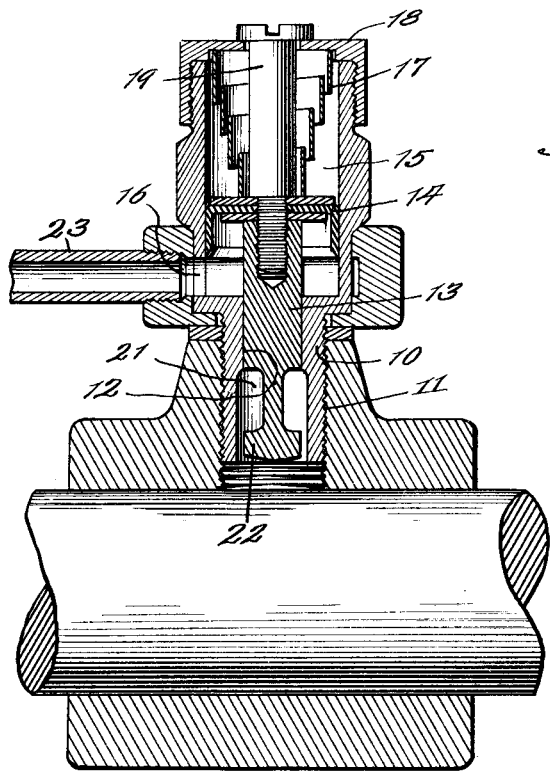
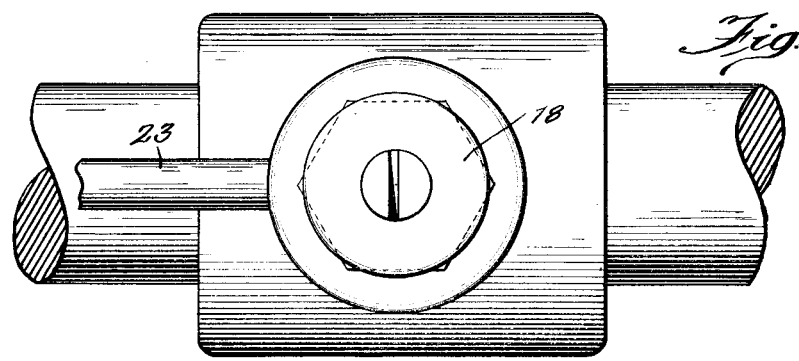

Patented May 9, 1933

1,907,622

UNITED STATES PATENT OFFICE

FRANCISCUS L. VAN WEENEN, OF ROTTERDAM, NETHERLANDS, ASSIGNOR OF ONE-HALF TO CORNELIS F. M. VAN BERKEL, OF WASSENAAR, NETHERLANDS

DEVICE FOR INJECTING LIQUID UNDER PRESSURE

Original application filed December 4, 1926, Serial No. 152,713, now Patent No. 1,806,770, dated May 26, 1931, and in Belgium December 30, 1925. Divided and this application filed October 8, 1927. Serial No. 224,829.

This invention relates to devices for injecting liquid under pressure, as, for example, the injection of lubricating oil into the parts to be lubricated or for the operation of hydraulic brakes or the injection of liquid fuel.

The object of the invention is to provide a device for increasing the pressure of the injected liquid which shall be simple and compact in construction, economical to manufacture, and efficient in operation.

Other objects will appear from the following description.

The invention is exemplified in the combination and arrangement of parts shown in the accompanying drawing and described in the following specification, and it is more particularly pointed out in the appended claims.

In the drawing,—

Fig. 1 is a vertical sectional view of one form of the invention applied to a bearing to be lubricated;

Fig. 2 is a top plan view of the device shown in Fig. 1.

This is a division of application, Serial No. 152,713, filed December 4, 1926, which has become patent No. 1,806,770 issued May 26, 1931.

The embodiment of the invention illustrated is that employed for injecting lubricating oil into bearings such as the bearings and other parts of an automobile requiring lubrication. The various injector units are applied directly to the part to be lubricated and are connected in parallel by suitable tubing with a force pump or other apparatus for supplying lubricating oil under pressure to the various injector units. Each unit, as shown in Figs. 1 and 2, comprises a body member 10 having a threaded shank 11, which may be attached to the bearing to be lubricated in the manner of an ordinary grease cup. The part 10 is bored to form a cylindrical opening 12 having a plunger 13 arranged to reciprocate therein. A piston 14 is secured to the upper end of the plunger 13 and is arranged to reciprocate in a cylindrical chamber 15. A passage 16 communicates with the cylindrical opening 15 and is connected by suitable piping with the pump for supplying lubricating fluid to the injectors. A spring 17 bears on the upper surface of the piston 14 and has its upper end engaged by a cap 18, which covers the top of the body member 10. A screw 19 is threaded into the top of the plunger 13 and holds the piston 14 in place on the plunger. The screw 19 extends upwardly through an opening in the cap 18 and the head of the screw closes the opening when the piston is in its inoperative position as shown in Fig. 1.

The lower end of the plunger 13 is provided with a recess 21, leaving a head 22 at the end of the plunger of a size to close the lower end of the chamber 12. The lower portion of the opening in the threaded shank 11 is slightly larger in diameter than the head 22 to permit the lubricating material to pass around the head 22 into the bearing. When the oil under pressure is supplied through the tube 23 the piston 14 will be lifted and the top end of the recess 21 will be brought into communication with the opening 15. This will permit the recess 21 to be filled with oil. At this time the head 22 will close the lower end of the chamber 12 so that only a definite quantity of oil can enter the recess 21. After the pressure has been relieved in the tube 23, the spring 17 will force the plunger 13 downwardly and discharge a quantity of oil into the bearing equal to the capacity of the recess 21. This arrangement avoids the necessity of a special valve for closing the lower end of the chamber 12 and does not require the pressure in the supply to be regulated with respect to the strength of a spring for closing such a valve.

A relatively small pressure in the pipe 23 will lift the plunger 13 against the force of the spring 17 because of the large area of the piston 14. When the pressure in the chamber 15 is released, however, the spring 17 will cause a much larger pressure per unit area in the chamber 12 because of the small area of the plunger 13. It will be apparent that if there is any leakage past the plunger 13 due to the high pressure in the chamber 12, the leakage will return to the chamber 15 and will not reach the outside of the device. The head of the screw 19 closes the chamber 15 to exclude all dirt and only lifts momentarily from its seat when the device is operated to inject lubricant. The movement of the screw can be observed to indicate whether or not the device is operating properly.

The extent of downward movement of the plunger 13 is regulated by the screw 19 and this may be varied by using screws of different lengths. The amount of oil discharge at each operation, will, of course, depend on the extent of downward movement of the plunger and by using screws of different lengths this may be regulated as desired.

I claim:

1. A device for injecting fluid under pressure comprising a body member having communicating chambers of different sizes therein, a piston arranged to reciprocate in the larger of said chambers, a plunger connected with said piston and arranged to reciprocate in the smaller of said chambers, said plunger having a recess therein movable into position to communicate with the larger of said chambers and receive fluid therefrom to be carried into the smaller of said chambers by movement of said plunger into a different position.

2. A device for injecting fluid under pressure comprising a body member having chambers therein of different sizes, a piston arranged to reciprocate in the larger of said chambers, a plunger connected with said piston and arranged to reciprocate in the smaller of said chambers, said plunger having a recess therein movable into position to communicate with the larger of said chambers, means on said plunger for closing the smaller of said chambers to prevent escape of fluid from said larger chamber through said recess when said recess is in communication with said larger chamber, means for injecting fluid under pressure into said larger chamber to move said piston and plunger in one direction, and a spring for returning said piston and plunger when the pressure in said larger chamber is relieved.

3. A device for injecting fluid under pressure comprising a body member having communicating chambers therein of different sizes, a piston arranged to reciprocate in one of said chambers, a plunger connected with said piston and arranged to reciprocate in the smaller of said chambers, means for introducing fluid under pressure into said larger chamber to retract said piston and plunger, said plunger having a recess therein communicating with said larger chamber when said plunger is retracted, means on said plunger for closing the end of said smaller chamber opposite said large chamber when said recess is in communication with said larger chamber, and a spring for advancing said piston and plunger to cause said plunger to discharge fluid from said smaller chamber when the fluid under pressure in said smaller chamber is released, the active surface of said piston being greater than the active surface of said plunger.

4. Means for injecting fluid under pressure comprising a body member having communicating chambers therein of different sizes, a plunger having a peripheral recess adjacent one end thereof arranged to reciprocate in the smaller of said chambers, a piston connected with said plunger and arranged to reciprocate in the larger of said chambers, a conduit for introducing fluid under pressure into said larger chamber at one side of said piston to retract said piston and plunger and bringing said recess into communication with said larger chamber to receive a charge of fluid from said larger chamber, and a spring for advancing said piston and plunger when the fluid pressure in said larger chamber is relieved, the area of said piston exposed to the action of said fluid pressure being greater than the active area of said plunger.

5. A device for injecting liquid comprising a member having a chamber therein, a passage communicating with said chamber, and a plunger mounted to reciprocate in said passage, said plunger having a recess therein communicating with said passage adjacent the end of said plunger and movable alternately into and out of communication with said chamber by the reciprocation of said plunger and for the purpose of transmitting liquid from said chamber through said passage to the end of said plunger, the pressure of the liquid within said chamber acting to establish communication between said recess and chamber.

6. A device for injecting liquid under pressure comprising a housing having a chamber therein, and a passage communicating with said chamber and connected with the object to be supplied with liquid, a piston fitting said chamber and arranged to reciprocate therein, means for supplying liquid under pressure to said chamber at the side of said piston adjacent said passage, a plunger fixed to said piston and fitting said passage, said plunger having a recess movable into communication with said chamber when said piston is retracted by pressure in said chamber, and a spring for returning said piston toward said passage, said plunger being movable by the action of said spring to a position to bring a portion of said recess into position to permit discharge of liquid from said recess.

7. A device for injecting liquid under pressure comprising a housing having a chamber therein, means for introducing lubricant under pressure into said chamber, an outlet from said chamber, a plunger adapted to reciprocate in said outlet, said plunger having a recess therein adapted to communicate alternately with said chamber and with the outer end of said outlet, a spring for moving said plunger in one direction in said outlet, means for moving said plunger in the opposite direction and a means for limiting the amount of movement given said plunger by said spring, said means being removably connected to said plunger to permit a similar means of different dimensions to be inserted in place thereof to thereby limit the movement of the plunger a different amount than with the first means which was removably connected thereto.

8. A device for injecting liquid under pressure comprising a housing having a chamber therein, means for introducing lubricant under pressure into said chamber, an outlet from said chamber, a plunger adapted to reciprocate in said outlet, said plunger having a recess therein adapted to communicate alternately with said chamber and with the outer end of said outlet, a spring for moving said plunger in one direction in said outlet, said plunger being moved in the opposite direction by the pressure of the lubricant introduced into said chamber, and means for limiting the amount of movement given said plunger by said spring, said means being removably connected to said plunger to permit a similar means of different dimensions to be inserted in place thereof to thereby limit the movement of said plunger a different amount than with the first means which was removably connected thereto.

9. A device for injecting a liquid under pressure comprising a member having a bore therein, a plunger adapted to reciprocate in said bore, a lubricant receiving chamber communicating with said bore, lubricant supplying means communicating with said receiving chamber, a delivery chamber communicating with said bore on the opposite side from said supply chamber, a recess in said plunger located in said plunger in a manner to communicate alternately with said receiving chamber and said delivery chamber, means for moving said plunger, said plunger being movable by the pressure of the fluid delivered to said receiving chamber to cause said recess to communicate with said receiving chamber and receive a quantity of lubricant therein, and means operable upon release of the pressure in said receiving chamber for moving said plunger in the opposite direction to deliver the supply of lubricant in said recess to said delivery chamber.

In testimony whereof I have signed my name to this specification on this 24th day of September, A. D. 1927.

FRANCISCUS L. van WEENEN.